United States Patent Office 3,812,078
Patented May 21, 1974

3,812,078
PLASTIC MATRIX AND RESIN COMPOSITION USED FOR PREPARING SAME
Yasuyuki Takimoto, Takatsuki, and Toshikazu Yoshikawa, Hirakata, Japan, assignors to Nippon Paint Co., Ltd., Osaka-fu, Japan
No Drawing. Filed Feb. 16, 1972, Ser. No. 226,942
Int. Cl. C08f 45/04, 45/06
U.S. Cl. 260—42.29
2 Claims

ABSTRACT OF THE DISCLOSURE

A plastic matrix prepared by shaping a resin composition comprising (a) a thermosetting polymerizable modified 1,2-polybutadienediol resin, (b) at least one lower temperature decomposable polymerization catalyst, (c) at least one higher temperature decomposable polymerization catalyst and (d) a filler into a sheet, molding the resulting sheet while contacting with an original plate and, after removal of the original plate completing the curing of the molded sheet. The plastic matrix can be molded at a relatively low temperature for a comparatively short time so that the original plate is not damaged or deformed even when made of a material being inferior in heat stability.

---

The present invention relates to a plastic matrix and a resin composition used for preparing the same. More particularly, it relates to a plastic matrix for making a relief pattern on the surface of a resinous material, and a resin composition used for preparing the same.

Hitherto, the provision of a relief pattern on the surface of a resinous material has been done in various fields, such as plastic material manufacturing industry and printing plate manufacturing industry, using a matrix. As the material for manufacture of a matrix, there has been employed usually a metal or a plastic material. In case of using a metal, the manufacture of the matrix is markedly complex and much expensive. In case of using a plastic material, the manufacture of the matrix is simple but, because of requiring a high temperature for molding, an original plate made of a material not stable to heat such as a plastic material is damaged or deformed. Thus, only a metal engraving or relief is utilizable as an original plate therefor. If any plastic matrix which can transfer a pattern from any original plate made of a thermostable material such as a metal or thermounstable material such as a plastic material can be provided, it may be highly valuable.

As the results of the study seeking the said ideal plastic matrix, it has been found that the use of a certain polymerizable resin with a lower temperature decomposable polymerization catalyst and a higher temperature decomposable polymerization catalyst makes it possible to realize such plastic matrix. It is notable that, for the manufacture of a plastic matrix, there have never been used two kinds of catalysts as mentioned above in combination.

According to the present invention, there is provided a plastic matrix which can be molded at a relatively low temperature for a comparatively short time so that an original plate is not damaged or deformed even when made of a material being inferior in heat stability.

The plastic matrix of the invention is prepared by shaping a resin composition comprising (a) a thermosetting polymerizable modified 1,2-polybutadienediol resin, (b) at least one lower temperature decomposable polymerization catalyst, (c) at least one higher temperature decomposable polymerization catalyst and (d) a filler into a sheet, molding the resulting sheet while contacting with an original plate and, after removal of the original plate, completing the curing of the molded sheet.

The resin composition used for the preparation of the plastic matrix of the invention comprises (a) a thermosetting polymerizable modified 1,2-polybutadienediol resin, (b) at least one lower temperature decomposable polymerization catalyst, (c) at least one higher temperature decomposable polymerization catalyst and (d) a filler.

As the modified 1,2-polybutadienediol resin, there may be used the one representable by the formula:

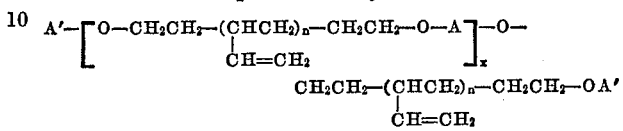

wherein A is an extender group such as a diisocyanate residue (e.g. 2,4-toluene diisocyanate residue, 2,6-toluene diisocyanate residue, 1,4-benzene diisocyanate residue, diphenylmethane diisocyanate residue, 1,5-naphthalene diisocyanate residue), A' is a modifier group such as a hydrogen atom or an ethylenic unsaturation containing alkanoyl group, preferably having 3 to 5 carbon atoms (e.g. acryloyl, methacryloyl) and $n$ is an integer of 7 to 54. The symbol $x$ indicates an integer which can keep the modified 1,2-polybutadienediol resin in liquid. Thus, the modified 1,2-polybutadienediol resin used in the present invention is required to be liquid. Among various resins fallen within the above formula, particularly preferred is the one extended with a toluene diisocyanate residue. Other examples of the resin are, for instance, described in Chem. & Eng. News, vol. 47, No. 14, page 43 (1969).

By the use of the modified 1,2-polybutadienediol resin as above stated, the curing in the manufacture of the plastic matrix can be attained in a short time. Moreover, the obtained plastic matrix is quite stable to heat.

The lower temperature decomposable polymerization catalyst may be the one decomposable at about 50 to 100° C. Specific examples are benzoyl peroxide, lauroyl peroxide, t-butyl peroxyisobutyrate, azobisisobutyronitrile, etc. The higher temperature decomposable polymerization catalyst may be the one decomposable at about 100 to 150° C. Specific examples are dicumyl peroxide, t-butyl peroxybenzoate, cyclohexanone peroxide, t-butyl peroxylaurate, etc. When these catalysts are solid such as benzoyl peroxide or dicumyl peroxide, they are preferably employed in the form of a dispersion into a conventional plasticizer (e.g. dioctyl phthalate, dibutyl phthalate). Each of the lower temperature decomposable polymerization catalyst and the higher temperature decomposable polymerization catalyst is normally used in an amount of about 0.5 to 10 parts by weight to 100 parts by weight of the modified 1,2-polybutadienediol resin.

By the combined use of the two kinds of the catalysts, the accomplishment of the molding at a half cure state or the completion of the curing in a short time is made possible.

As the filler, there may be employed silica, clay, talc, calcium carbonate, glass flake, zinc white, alumina, magnesia, calcium silicate, etc. The amount of the filler to be incorporated is usually from about 100 to 500 parts by weight to 100 parts by weight of the modified 1,2-polybutadienediol resin.

The incorporation of the filler serves to provide the resulting resin composition with the flowing required for molding. In addition, it serves to prevent the shrinkage of the plastic matrix made of the resin composition on curing.

The resin composition may include, in addition to the said four essential components, any additive such as a fiber reinforcing material (e.g. glass fiber, rayon fiber, tungsten fiber, molybdenum fiber, boron fiber), a silane coupling agent (e.g. γ-methacryloxypropyl trimethoxysilane, vinyltriethoxysilane, vinyl tris(β-methoxyethoxy)silane), a polymerization inhibitor (e.g. 2,6 -di-t-butyl-p-cresol, 2,2'-methylene-bis(6-t-butyl-m-cresol), 4,4'-butylidene-bis(6-t-butyl-m-cresol) and/or a pigment (e.g. iron oxide pigment, chrome green).

The fiber reinforcing material is used for increasing the mechanical strength of the ultimate plastic matrix, usually in about 5 to 30% by weight on the basis of the weight of the modified 1,2-polybutadienediol resin. Among various fiber reinforcing materials as exemplified above, the use of glass fiber, particularly glass chopped strand of about 3 to 13 mm. long, is preferred.

The function of the silane coupling agent is to increase the compatibility of the modified 1,2-polybutadienediol resin with, if any, the fiber reinforcing material and the filler so as to improve the mechanical strength and the removing property of the molded sheet. Usually, the amount of the silane coupling agent is from about 1 to 10% by weight on the basis of the weight of the modified 1,2-polybutadienediol resin.

The polymerization inhibitor is employed for preventing the unfavorable hardening or excessive curing of the modified 1,2-polybutadienediol resin on storage or molding, usually in an amount of about 0.1 to 1% by weight based on the weight of the modified 1,2-polybutadienediol resin.

The incorporation of the pigment, usually in an amount of about 0.5 to 5% by weight based on the weight of the modified, 1,2-polybutadienediol resin, serves the improvement of the workability on checking the letters.

The resin composition may contain also any other additive such as an internal parting agent (e.g. zinc stearate, calcium stearate, powdery polyethylene) or a metal powder (e.g. aluminum powder, iron powder). The internal parting agent is used to assist the parting of the molded sheet from an original plate or the like and may be employed ordinarily from about 1 to 10% by weight on the basis of the weight of the modified 1,2-polybutadienediol resin. The metal powder is effective in preventing the shrinkage of the ultimate plastic matrix by the use in an amount of about 1 to 10% by weight on the basis of the weight of the modified 1,2-polybutadienediol resin.

When the resin composition includes any electroconductive pigment (e.g. red iron oxide, graphite) or metal powder (e.g. aluminum powder, iron powder), the ultimate plastic matrix made thereof can be galvanized in a per se conventional procedure.

The essential and optional components as above mentioned are mixed using a conventional mixing machine such as a kneader to obtain a uniform resin composition. The temperature at the mixation is required to be not higher than the depolymerization catalyst and may be usually from about 40 to 100° C.

The thus obtained resin composition is then shaped, usually at room temperature, in a sheet by the aid of a conventional shaping machine such as a molding press, a natural roll, an extruder or an injection molding machine to give a resin sheet. Since the resin sheet is in a gummy state, it may be reinforced by supporting on a support material such as a metal plate (e.g. steel plate, aluminum plate) or a plastic plate, if necessary, with a bonding agent.

The resulting resin sheet may be molded as such or after half curing. In order to effect half curing, the resin sheet is maintained around the decomposition temperature of the lower temperature decomposable polymerization catalyst. Such half curing is advantageous in preventing the formation of voids in the molded sheet which may occasionally happen in case of the flowing of the resin composition being high and facilitating the removal of the molded sheet from an original plate so that the molding at room temperature is made possible. Moreover, the half curing is effective in shortening the time for post curing. From the practical viewpoint, the extent of half curing may be determined appropriately by the use of a Shore's durometer A. Particularly favorable, but not critical, is the hardness showing a value of 20 to 80 (20° C.).

The molding of the resin sheet while contacting an original plate thereon may be accomplished on heating or at room temperature; in the latter case, the curing is perfected by heating at a temperature equal to or higher than the decomposition temperature of the higher temperature decomposable polymerization catalyst.

In the present invention, the temperature for molding is usually from about 110 to 140° C. When the original plate is too large or thermosensitive, then the molding may be executed at room temperature. Compared with the molding temperature in using a conventional resin sheet as shown in Table 1, it may be understood that the molding temperature in using the resin sheet of the invention is considerably low.

The matrix producing procedure consists of two stages, i.e. matrix molding stage and post curing stage. In the matrix molding stage, curing is interrupted to an extent that the resulting product remains still not in a solid state but in a gel state, such state being called herein "half curing." After removing the original plate, the curing of the molded sheet is completed, i.e. in the post curing stage, by heating at about 160 to 200° C. to give a plastic matrix.

Since the matrix production is carried out in two stages as above, the original plate is never damaged or deformed. Further, the plastic matrix has an exactly transferred pattern from the original plate, because the resin sheet on molding is provided with an excellent flowing. Furthermore, the plastic matrix is excellent in heat stability and mechanical strength.

When desired, the plastic matrix may be so produced as having a curved surface. In order to realize this, the molded sheet after molding and before post curing may be curved in an appropriate manner and then post cured.

Further, the plastic matrix may be galvanized on the surface so as to increase its abrasion resistance and mechanical strength. For attaining this, the plastic matrix made of the resin composition containing an electro-conductive material may be, after post curing, treated in an electrolytic bath, e.g. of an aqueous copper sulfate solution, under galvanization conditions in a conventional manner. By the use of the galvanized matrix, a quite larger number of plastic duplicate plates can be casted. It is particularly useful in case of embossing a plastic material.

As the polymer material suitable for casting of plastic duplicates by the use of the plastic matrix of the invention, there may be exemplified polyolefins (e.g. polyethylene, polypropylene), polyvinylidene chloride, polyether, polyacrylate, polymethacrylate, polyamide, polycarbonate, polyhydroxyether, etc. Other vinyl polymers, copolymers and their mixtures may be also used.

Practical and presently preferred embodiments of the present invention are illustratively shown in the following examples wherein parts are by weight.

EXAMPLE 1

(1) Preparation of the resin composition

A modified 1,2 - polybutadienediol resin (molecular weight of 1,2-polybutadienediol, 2000; extender, 2,4-toluene diisocyanate; "Nisso PB TE2000" manufactured by Nippon Soda Co., Ltd.) (100 parts), 2,6-di-t-butyl-p-cresol (0.1 part), γ-methacryloxypropyl trimethoxysilane (4.5 parts), silica (350 parts), zinc stearate (4.5 parts) and iron oxide pigment (1 part) are mixed in a pressure kneader at a temperature from 55 to 60° C. for 1 hour. After addition of t-butyl peroxybenzoate (4 parts), benzoyl peroxide (1 part) dispersed in dioctyl phthalate (14 parts) and glass chopped strand of 3 mm. long (15 parts) thereto, further mixation is carried out at a temperature of 55 to 60° C. for 5 minutes to give a resin composition.

(2) Preparation of the resin sheet

A releasing paper is placed on a lower plate in a flexography molding press, and bearers of 3 mm. thick are provided on both sides of the releasing paper. On the releasing paper, a tin plate of 0.3 mm. thick is placed as a base plate, and the resin composition is put thereon. After placing a releasing paper on the resin composition, the lower plate is elevated in 10 seconds for shaping. The shaping is effected at room temperature under a pressure of 20 kg./cm.$^2$ for 1 minute. The releasing paper on the thus shaped sheet is eliminated, and the shaped sheet with the tin plate is heated at 80° C. for 40 minutes. There is obtained a resin sheet of 2.7 mm. thick showing a hardness of 20 to 80 (20° C.) when determined according to Shore Hardness A.

(3) Preparation of the plastic matrix

A flexography molding press having a lower plate heated at 130° C. and an upper plate heated at 125° C. is used for molding. A releasing paper is placed on the lower plate, and bearers of 2.7 mm. thick are provided on both sides of the releasing paper. On the releasing paper, the resin sheet is placed, and a photopolymer engraving is placed thereon. Covering the photopolymer engraving and the bearers with a releasing paper, the lower plate is elevated in 10 seconds for molding. The molding is carried out under a pressure of 20 kg./cm.$^2$ for 1.5 minutes. The photopolymer engraving is removed. The molded sheet is then completely cured using a flexography molding press heated at 180° C. for 1 minute to give a plastic matrix of 2.5 mm. in. thick. The plastic matrix may be used for casting polypropylene to prepare a plastic duplicate plate.

EXAMPLE 2

(1) Preparation of the resin composition

As in Example 1 (1) but using dicumyl peroxide (4 parts) in place of t-butyl peroxybenzoate (4 parts), a resin composition is prepared.

(2) Preparation of the resin sheet

As in Example 1 (2), the resin composition obtained as above is shaped under pressure to shape a resin sheet supported on a tin plate, of which the thickness is 3 mm.

(3) Preparation of the plastic matrix

As in Example 1 (3), a plastic matrix is prepared using the resin sheet obtained as above. The plastic matrix may be used for casting polypropylene to prepare a plastic duplicate plate.

EXAMPLE 3

(1) Preparation of the resin composition

A modified 1,2 - polybutadienediol resin (molecular weight of 1,2-polybutadienediol, 2000; extender, 2,4-toluene diisocyanate; "Nisso PB TE2000" manufactured by Nippon Soda Co., Ltd.) (100 parts), 2,6-di-t-butyl-p-cresol (0.1 part), γ-methacryloxypropyl trimethoxysilane (4.5 parts), silica (100 parts), clay (250 parts), zinc stearate (4.5 parts) and iron oxide pigment (1 part) are mixed in a pressure kneader at a temperature from 55 to 60° C. for 1 hour. After addition of t-butyl peroxybenzoate (4 parts) and benzoyl peroxide (0.5 part) dispersed carried out at a temperature of 55 to 60° C. for 5 minutes to give a resin composition.

(2) Preparation of the resin sheet

Shaping is effected using a T die extruder having a diameter of 76 mm. and being L/D=16. The lip width and the distance of the T die are 400 mm. and 3 mm., respectively. The resin composition obtained as above is extruded at room temperature with a screw rotation of 20 r.p.m. The extruded sheet is piled on a tin plate of 0.3 mm. thick intervening a bonding agent. The piled product is then heated at 80° C. for 30 minutes to give a resin sheet supported on the tin plate, of which the thickness is 3 mm. The hardness is 40 to 80 (20° C.) when determined according to Shore Hardness A.

(3) Preparation of the plastic matrix

Molding is effected using a flexography molding press at room temperature. A releasing paper is placed on the lower plate, and bearers of 3 mm. thick are provided on both sides of the releasing paper. On the releasing paper, the resin sheet obtained as above is placed, and a photopolymer engraving is placed thereon. Covering the photopolymer engraving and the bearers with a releasing paper, the lower plate is elevated in 10 seconds for molding. The molding is carried out at room temperature under a pressure of 20 kg./cm.$^2$ for 5 seconds. The photopolymer engraving is removed. The molded sheet is then completely cured using a flexography molding press heated at 180° C. for 1.5 minutes to give a plastic matrix of 3 mm. thick. The plastic matrix may be used for casting polypropylene to prepare a plastic duplicate plate.

EXAMPLE 4

(1) Preparation of the resin composition

A modified 1,2-polybutadienediol resin (molecular weight of 1,2-polybutadienediol, 2000; extender, 2,4-toluene diisocyanate; "Nisso PB TE2000" manufactured by Nippon Soda Co., Ltd.) (100 parts), 2,6-di-t-butyl-p-cresol (0.1 part), γ-methacryloxypropyl trimethoxysilane (4.5 parts), clay (350 parts), zinc stearate (4.5 parts) and iron oxide pigment (1 part) are mixed in a presure kneader at a temperature from 75 to 100° C. for 2 hours. After cooling to 70° C., t-butyl peroxybenzoate (4 parts), glass chopped strand of 3 mm. long (10 parts) and benzoyl peroxide (0.5 part) dispersed in dioctyl phthalate (7 parts) are added thereto. Further mixation is effected at a temperature from 60 to 70° C. for 10 minutes to give a resin composition.

(2) Preparation of the resin sheet

Shaping is effected using a T die extruder having a diameter of 76 mm. and being L/D=16. The lip width and the distance of the T die are 400 mm. and 2.5 mm., respectively. The resin composition obtained as above is extruded at room temperature with a screw rotation of 20 r.p.m. The extruded sheet is piled on a polyester sheet of 0.3 mm. thick to give a resin sheet supported on the polyester sheet, of which the thickness is 2 mm.

(3) Preparation of the plastic matrix

As in Example 1 (3) but using bearers of 2 mm. thick, the resin sheet obtained as above is molded to give a plastic matrix of 2 mm. thick. The plastic matrix may be used for casting polypropylene to prepare a plastic duplicate plate.

EXAMPLE 5

In preparation of a plastic matrix as in Example 3 (3), the molded sheet after half curing is attached on the outer surface of an iron pipe of 200 mm. in diameter and heated at 200° C. for 1.5 minutes so as to complete curing. The thus prepared plastic matrix has a curved surface. It may be used for casting polypropylene to prepare a plastic duplicate plate.

EXAMPLE 6

As in Example 4 (2) and (3), a plastic matrix is prepared using the same resin composition as in Example 4 (1) but containing additionally reduced iron powder (5 parts). The plastic matrix is cleaned with gasoline and galvanized under the following conditions to give a copper galvanized matrix:

Concentration of aqueous copper sulfate: 250 g./l.
Concentration of hydrosulfuric acid: 60 to 70 g./l.
Temperature: 20° C.
Anode current density: 2 to 5 a./dm.$^2$ The conditions under which the plastic matrixes were produced according to the present invention and according to conventional processes are comparatively shown in the following table:

TABLE

| No. | Plastic matrix | Molding temperature | Molding time* | Time required for production** | Original plate which can be utilized |
|---|---|---|---|---|---|
| 1 | According to the present invention | 110-140° C / Room temp | 1.5 minutes / 5 seconds | 3 minutes / 2.5 minutes | Metal etchings, photopolymer engravings. |
| 2 | According to a conventional process (polysulfone system). | 200° C | 2.5 minutes | 3 minutes | Metal etchings. |
| 3 | According to a conventional process (phenol system). | 150° C | 15 minutes | 16 minutes | Do. |

*Time required for molding while contacting the resin sheet on the original plate.
**Time required for molding, post curing and cooling in case of No. 1 and for molding and cooling in case of No. 2 and 3.

From the above table, it is understood that the plastic matrix of the present invention can be molded at a much lower temperature (e.g. room temperature) than the temperature required for molding according to the conventional processes. Thus, the original plate is hardly damaged or deformed. Further, it is understood that the time required for production of the plastic matrix according to this invention is considerably shorter than that according to the conventional processes. Thus, the workability is highly increased. Furthermore, it is understood that the kind of the original plate which is utilizable is not so restrictive in the present invention as in the conventional processes. Thus, the original plate made of a material having an inferior heat stability can be used for the production of the plastic matrix according to the invention.

Since the present invention overcomes various defects as seen in the conventional processes, it will contribute to the recent trend of the movement from a papier-mâché matrix-lead plate process to a plastic matrix-plastic duplicate plate process in the printing field. In addition the present invention makes it possible to manufacture a plastic matrix having a curved surface by curving the molded sheet and post curing the resultant curved product. Such plastic matrix can be used as a roll for molding a decoration plastic sheet or as a textile printing roll.

What is claimed is:
1. A resin composition consisting essentially of:
   (a) a thermosetting polymerizable modified 1,2-polybutadienediol resin, including a 1,2-polybutadienediol chain as the main constituent, a diisocyanate residue as an extender group for said main constituent and a hydrogen atom or an ethylenically unsaturated alkanoyl group having about 3 to 5 carbon atoms as a modifier group for said resin,
   (b) the combination of at least one lower temperature decomposable polymerization catalyst, selected from the group consisting of benzoyl peroxide, lauroyl peroxide, t-butyl peroxyisobutyrate, and azobisisobutyronitrile, and at least one higher temperature decomposable polymerization catalyst, selected from the group consisting of dicumyl peroxide, t-butyl peroxybenzoate, cyclohexanone peroxide and t-butyl peroxylaurate, each of said catalysts being present in an amount of about 0.5 to 10 parts by weight based upon 100 parts by weight of said polymerizable modified 1,2-polybutadienediol resin, and
   (c) a filler selected from the group consisting of silica, clay, talc, calcium carbonate, glass flake, zinc white, alumina, magnesia or calcium silicate, wherein said filler is present in an amount of about 100 to 500 parts by weight, based upon 100 parts by weight of said polymerizable modified 1,2-polybutadiendiol resin.

2. The resin composition according to claim 1 wherein said lower temperature decomposable polymerization catalyst is benzoyl peroxide and wherein said higher temperature polymerization catalyst is t-butyl peroxybenzoate.

References Cited
UNITED STATES PATENTS

| 3,084,141 | 4/1963 | Kraus | 260—77.5 CR |
| 3,515,772 | 6/1970 | Lubowitz | 260—77.5 CR |
| 3,427,366 | 2/1969 | Verdol | 260—77.5 CR |
| 3,338,861 | 8/1967 | Mastin | 260—37 N |

LEWIS T. JACOBS, Primary Examiner
P. R. MICHL, Assistant Examiner

U.S. Cl. X.R.
260—42.43, 42.37, 42.32, 42.18, 77.5 AB; 264—347